(12) United States Patent
Zhang et al.

(10) Patent No.: US 12,294,195 B2
(45) Date of Patent: May 6, 2025

(54) METHOD AND SYSTEM FOR CONTROLLING RAMAN FIBER AMPLIFIER

(71) Applicant: Accelink Technologies Co., Ltd, Wuhan (CN)

(72) Inventors: Hao Zhang, Wuhan (CN); Chengpeng Fu, Wuhan (CN); Jintao Tao, Wuhan (CN); Lijing Cheng, Wuhan (CN); Bingmei Zeng, Wuhan (CN); Jingyang Fan, Wuhan (CN)

(73) Assignee: Accelink Technologies Co., Ltd., Wuhan (CN)

( * ) Notice: Subject to any disclaimer, the term of this patent is extended or adjusted under 35 U.S.C. 154(b) by 923 days.

(21) Appl. No.: 17/434,502

(22) PCT Filed: Dec. 13, 2019

(86) PCT No.: PCT/CN2019/125258
§ 371 (c)(1),
(2) Date: Aug. 27, 2021

(87) PCT Pub. No.: WO2020/173182
PCT Pub. Date: Sep. 3, 2020

(65) Prior Publication Data
US 2022/0131336 A1 Apr. 28, 2022

(30) Foreign Application Priority Data
Feb. 27, 2019 (CN) .......................... 201910144665.2

(51) Int. Cl.
*H01S 3/13* (2006.01)
*H01S 3/067* (2006.01)
*H01S 3/30* (2006.01)

(52) U.S. Cl.
CPC ........ *H01S 3/1305* (2013.01); *H01S 3/06754* (2013.01); *H01S 3/1301* (2013.01); *H01S 3/302* (2013.01); *H01S 2301/02* (2013.01)

(58) Field of Classification Search
CPC ..... H01S 3/302; H01S 3/1305; H01S 2301/02
See application file for complete search history.

(56) References Cited

U.S. PATENT DOCUMENTS 6,631,027 B2 10/2003 Gerrish et al.
8,797,640 B2 8/2014 Fu et al.
(Continued)

FOREIGN PATENT DOCUMENTS

CN 102307068 A 1/2012
CN 106160868 A 11/2016
(Continued)

OTHER PUBLICATIONS

International Search Report for PCT/CN2019/125258 mailed Mar. 11, 2020; 2 pages.
(Continued)

*Primary Examiner* — Eric L Bolda
(74) *Attorney, Agent, or Firm* — Smith Tempel Blaha LLC; Lei Fang, Esq.

(57) ABSTRACT

Provided are a method and system for controlling a Raman fiber amplifier. The method comprises: according to a target gain and a tilt, calculating an expected output power of a pump by using a feedforward formula, and obtaining an actual output power of the pump through detection (201); locking the actual output power of the pump to the expected output power through first-stage feedback control (202); according to the target gain and the tilt, calculating an expected ASE power of the pump by using an ASE formula, and obtaining an actual out-of-band ASE power of the pump through detection (203); if the out-of-band ASE is not locked, determining gain compensation and tilt compensation of the pump through second-stage feedback control, and feeding the compensation back to the feedforward formula and the ASE formula for recalculation (204); and repeatedly performing the first-stage feedback control and the second-stage feedback control until the gain and the tilt are locked (205). In the system, a combination of feedforward and multi-closed loop feedback control is used to realize rapid locking of a pump power and locking of the gain and the tilt compensation, which improves the control precision of the gain and the tilt and accelerates a response speed.

10 Claims, 2 Drawing Sheets

(56) References Cited

U.S. PATENT DOCUMENTS

| | | | | |
|---|---|---|---|---|
| 2002/0041429 A1* | 4/2002 | Sugaya | ............... | H01S 3/06758 |
| | | | | 359/334 |
| 2005/0105167 A1 | 5/2005 | Martinelli et al. | | |
| 2012/0327505 A1* | 12/2012 | Fu | ....................... | H04B 10/2916 |
| | | | | 359/334 |
| 2014/0253998 A1* | 9/2014 | Otani | .................. | H01S 3/10015 |
| | | | | 359/341.41 |
| 2021/0344163 A1* | 11/2021 | Zhang | ................. | H01S 3/06754 |

FOREIGN PATENT DOCUMENTS

| | | |
|---|---|---|
| CN | 107437721 A | 12/2017 |
| EP | 1522840 A1 | 4/2005 |

OTHER PUBLICATIONS

Search Report from Chinese Application No. 201910144665.2 issued Mar. 15, 2020; 2 pages.

\* cited by examiner

METHOD AND SYSTEM FOR CONTROLLING RAMAN FIBER AMPLIFIER

CROSS-REFERENCE TO RELATED APPLICATIONS

The present application is a national phase entry under 35 U.S.C § 371 of International Application No. PCT/CN2019/125258 filed Dec. 13, 2019, which claims priority from Chinese Application No. 201910144665.2 filed Feb. 27, 2019, all of which are hereby incorporated herein by reference.

TECHNICAL FIELD OF THE DISCLOSURE

The present disclosure relates to the technical field of Raman fiber amplifiers, and specifically provides a method and system for controlling a Raman fiber amplifier.

BACKGROUND

Now, a Raman fiber amplifier has been widely applied in an optical communication system based on dense wavelength division multiplexing. Compared with an erbium-doped fiber amplifier, the Raman fiber amplifier can use an optical fiber itself as a gain medium, and it has the characteristics of full-band amplification and distributed amplification, which makes it to be especially suitable for a long-distance, ultra-long-distance and submarine transmission system. The research and practical application of Raman fiber amplifier has accelerated the development course of optical communication.

At present, there are mainly two methods for controlling a Raman fiber amplifier, i.e. an analog solution and a digital solution, respectively. In the analog solution, an analog circuit and a digital circuit are used to build a closed-loop control loop, and a single-chip microcomputer is used to assist in the control process. In the digital solution, a single-chip microcomputer, a Field-Programmable Gate Array (FPGA), and a digital-to-analog conversion chip, etc., are used to convert analog signals into digital signals which can be processed by the FPGA, and to process a closed-loop algorithm and perform parallel control through an FPGA, so as to realize real-time gain control. Compared with the analog solution, the digital solution is higher in flexibility, better in dynamic characteristic and richer in function, therefore, its application is wider. In the digital solution, proportional control is typically used to realize equalization of gain and tilt for multi-pump output control, however, when operating in the C+L band, the proportion of each pump is difficult to control, so that the gain and the tilt are low in precision, and the regulation period is long. At this time, the pump proportion distribution algorithm is difficult to realize gain equalization under different conditions, and the portability and the reusability are not high.

Therefore, overcoming the defects existing in the prior art is a problem to be urgently solved in the present technical field.

SUMMARY

The technical problem to be solved in the present disclosure is as follows:

When a Raman fiber amplifier operates in a C+L band, a pump proportion distribution algorithm is difficult to realize gain equalization under different conditions, the gain and the tilt are low in precision, and the portability and the reusability are not high.

The present disclosure realizes the above purpose through the following technical solutions.

In a first aspect, the present disclosure provides a method for controlling a Raman fiber amplifier, comprising:

according to a set target gain and a set target tilt, calculating expected output power of each pump by using a feedforward formula, and obtaining actual output power of each pump through PD detection;

locking actual output power of each pump to the corresponding expected output power through first-stage feedback control;

according to the set target gain and the set target tilt, calculating expected out-of-band ASE power of each pump by using an ASE formula, and obtaining actual out-of-band ASE power of each pump through PD detection;

in a case where out-of-band ASE power of a pump is not locked, determining gain compensation and tilt compensation of the pump through second-stage feedback control, and feeding the compensation back to the feedforward formula and the ASE formula for recalculation; and repeatedly performing the first-stage feedback control and the second-stage feedback control to each pump, until the actual out-of-band ASE power of the pump is locked to the corresponding expected out-of-band ASE power to realize the locking of the gain and the tilt.

Preferably, before calculating the expected output power of each pump by using the feedforward formula, the method further comprises: outputting one power to the corresponding pump in a case where each pump is turned on, and then calculating an insertion loss of optical fiber currently accessing each pump according to the actual out-of-band ASE detection power;

then after the expected output power of each pump is calculated by using the feedforward formula, the method further comprises: compensating the corresponding calculated insertion loss to the expected output power of each pump as the expected output power for subsequent use.

Preferably, for each pump, regulating the target gain and the target tilt in a stepping manner when setting the both, thereby gradually modulating a gain from zero to the target gain, and gradually modulating a tilt from zero to the target tilt.

Preferably, for each pump, the process of the first-stage feedback control is specifically as follows:

setting a reasonable proportional parameter and a reasonable differential parameter through a PID controller, and regulating pump output DAC without shaking, so as to regulate a pump driving current, thereby locking the actual output power of the pump to the corresponding expected output power.

Preferably, before calculating the expected output power of each pump by using the feedforward formula according to the set target gain and the set target tilt, the method further comprises:

setting N fixed gain points in an AGC mode, respectively calculating difference between unamplified input optical power at each fixed gain point and the input optical power in a case where the pump is turned off, and performing curve fitting on the differences and gains, so as to obtain an error fitting curve of different gain points, wherein $N \geq 3$;

then after the set target gain is provided, determining a gain compensation amount corresponding to the currently set gain point according to the error fitting curve, and compensating the currently set target gain by the gain compensation amount, so as to be subsequently used in the feedforward formula and the ASE formula.

Preferably, for each pump, the feedforward formula needs to be calibrated according to the tilt in advance, specifically, under the current tilt, determining output power of each pump under different gains, then performing curve fitting; determining a relevant parameter in the feedforward formula corresponding to each pump according to the fitting curve, and then completing the calibration of the feedforward formula.

Preferably, for each pump, the ASE formula needs to be calibrated according to the tilt in advance, specifically, under the current tilt, determining a leakage factor of each pump and the out-of-band ASE power under different gains, then performing curve fitting; and determining a relevant parameter in the ASE formula corresponding to each pump according to the fitting curve, and then completing the calibration of the ASE formula.

Preferably, for each pump, the first-stage feedback control needs to be calibrated in advance, specifically, entering an APC mode, setting the expected output power of each pump, regulating a proportional parameter, differential parameter and regulation period of a PID feedback algorithm in the first-stage feedback control, so that the output of each pump can be stably locked to target power, thereby making the first-stage feedback control effective.

Preferably, for each pump, the second-stage feedback control needs to be calibrated in advance, specifically, entering an AGC mode, setting an expected gain and an expected tilt of each pump, regulating a proportional parameter, differential parameter and regulation period of a PID feedback algorithm in the second-stage feedback control, so that the out-of-band ASE power of each pump can steadily approach a target value through feedback regulation, thereby realizing the lock of the out-of-band ASE power through the compensation of gain and tilt.

In a second aspect, the present disclosure further provides a system for controlling a Raman fiber amplifier for completing the method for controlling the Raman fiber amplifier described in the first aspect, the system comprising: a feedforward calculation module, a pump power calculation module, a first-stage feedback control module, an expected out-of-band ASE calculation module, an actual out-of-band ASE calculation module, a second-stage feedback control module, and one or more pumps;

wherein the feedforward calculation module is used for calculating expected output power of each pump according to a currently set gain and tilt; the pump power calculation module is used for calculating actual output power of each pump according to PD detection; the first-stage feedback control module is used to lock the actual output power of each pump to the expected output power through a feedback algorithm;

the expected out-of-band ASE calculation module is used for calculating expected out-of-band ASE power of each pump according to the currently set gain and tilt; the actual out-of-band ASE calculation module is used for calculating actual out-of-hand ASE power of each pump according to the PD detection; the second-stage feedback control module is used for determining gain compensation and tilt compensation of each pump through a feedback algorithm, and feeding them back to the feedforward calculation module and the expected out-of-band ASE calculation module.

Compared with the prior art, the beneficial effects of the embodiments of the present disclosure are as follows:

In the method for controlling the Raman fiber amplifier according to the embodiments of the present disclosure, a structure of the feedforward combined with the multi-closed loop feedback control is used, and the rapid locking of pump power can be realized through the feedforward calculation and the first-stage feedback, and the automatic compensation, regulation and locking of the gain and the tilt can be realized by means of the control of the out-of-band ASE through the second-stage feedback, which improves the control precision of the gain and the tilt and accelerates the response speed. The present method can be flexibly applied to Raman fiber amplifiers in a C+L band, a C hand, a L band and other bands, and realize output power control of multi-pump and control regulation of gain and tilt.

BRIEF DESCRIPTION OF THE DRAWINGS

In order to more clearly explain the technical solutions of embodiments of the present disclosure, the following will briefly introduce the drawings to be used in the embodiments of the present disclosure. Obviously, the drawings to be described below are only some examples of the present disclosure, and for those ordinary skill in the art, other drawings can be obtained based on these drawings without inventive efforts.

DETAILED DESCRIPTION

In order to make the objects, technical solutions and advantages of the present disclosure more obvious, the present disclosure is further described in detail below with reference to the accompanying drawings and embodiments. It shall be understood that the specific embodiments described herein are only for explaining the present disclosure but not for limiting the present disclosure.

In the description of the present disclosure, for ease of understanding, the English abbreviations appeared are explained as follows:

1) ASE, Amplified Spontaneous Emission; 2) ADC, Analog-Digital Conversion, i.e. converting an analog signal into a digital signal; 3) DAC, Digital-Analog Conversion, i.e. converting a digital signal into an analog signal; 4) PID, Proportion-Integral-Differential; 5) AGC. Automatic Gain Control; 6) APC, Automatic Power Control.

In addition, the technical features involved in various embodiments of the present disclosure described below may be combined with each other as long as they do not conflict with each other. Hereinafter, the present disclosure will be described in detail with reference to the accompanying drawings and embodiments.

Embodiment 1

Figure 1:
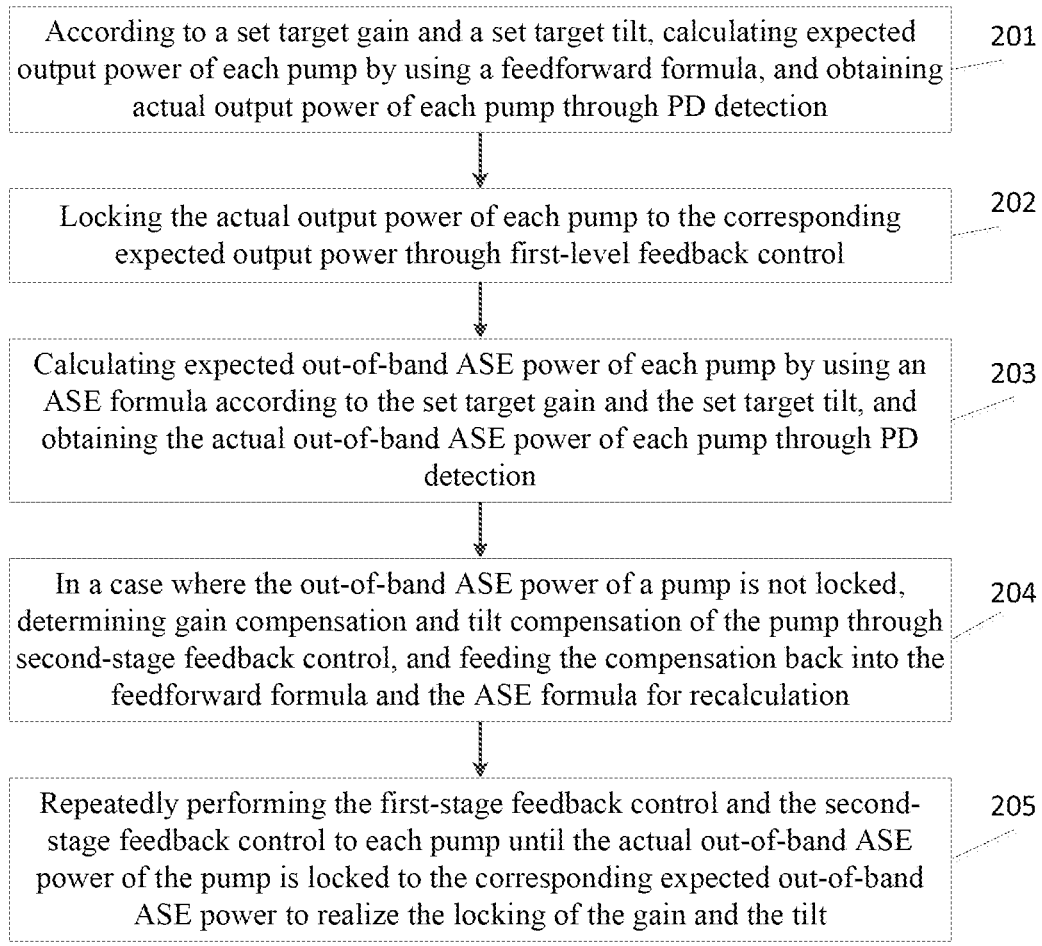
FIG. 1 is a flowchart of a method for controlling a Raman fiber amplifier according to an embodiment of the present disclosure.

An embodiment of the present disclosure provides a method for controlling a Raman fiber amplifier, which can be used to realize output power control, and gain and tilt control and regulation of multi-pump in the Raman fiber amplifier. In combination with FIG. 1 and FIG. 2, the control method provided by the embodiment of the present disclosure is performed in an ACC normal working mode (i.e. gain mode), and specifically comprises the following steps:

Step 201: according to a set target gain and a set target tilt, calculating expected output power of each pump by using a feedforward formula, and obtaining actual output power of each pump through PD detection.

The target gain and the target tilt can be set according to customer requirements or actual application requirements, and the gain and tilt can be rapidly modulated to near the target range through feedforward control after the pump is turned on. The relationship between the expected output power mw of each pump and a current gain (gain) and a current tilt (tilt) can be represented by a binary function mw=f(gain, tilt), i.e. a feedforward formula. For each pump, the feedforward formula needs to be calibrated in advance, i.e. to determine a relevant parameter in the formula; after the calibration is completed, the expected output power of each pump can be calculated according to the currently set gain and tilt.

The pump in FIG. 2 can represent any one of the multiple pump lasers (hereinafter referred to as pump) in the Raman fiber amplifier. For each pump, the actual output power is obtained by performing PD detection on the pump light generated by the pump, and then by performing a sample and calculation after photoelectric conversion and analog-digital conversion.

Step 202: locking the actual output power of each pump to the corresponding expected output power through first-level feedback control.

The control target of the first-stage feedback control is to control the actual output power of each pump to be equal to the expected output power through a feedback algorithm, so as to realize the rapid locking of the pump power. The feedback algorithm can usually use a PID feedback algorithm, and specifically a PID controller is adopted, i.e. a proportional-differential-integral controller. In the present embodiment, only the proportion and the differentiation are used, and each pump uses one PID controller. Then the process of the first-stage feedback control is specifically as follows: setting a reasonable proportional parameter and differential parameter under an actual condition through the PID controller, and regulating pump output DAC so as to regulate a pump driving current while keeping the pump output not shaking, thereby rapidly locking the actual output power of the pump to the corresponding expected output power.

Step 203, calculating expected out-of-band ASE power of each pump by using an ASE formula according to the set target gain and the set target tilt, and obtaining the actual out-of-band ASE power of each pump through PD detection.

Since the input of the Raman fiber amplifier is its output, it is not possible to determine whether the target gain is reached according to the input power and the output power, thus the gain is controlled by using the out-of-band ASE, and whether the gain and tilt are locked is determined through determining whether the out-of-hand ASE reaches the expectation. Accordingly, it is needed to firstly determine the expected out-of-band ASE power and the actual out-of-band ASE power of each pump.

The relationship between the expected out-of-band ASE power expect_ase and the current gain and tilt of each pump can be expressed by a binary function expect_ase=g (gain, tilt), i.e an ASE formula. For each pump, the ASE formula needs to be calibrated in advance, i.e. to determine a relevant parameter in the formula; after the calibration is completed, the expected out-of-band ASE power of each pump can be calculated according to the currently set gain and tilt.

Figure 2:
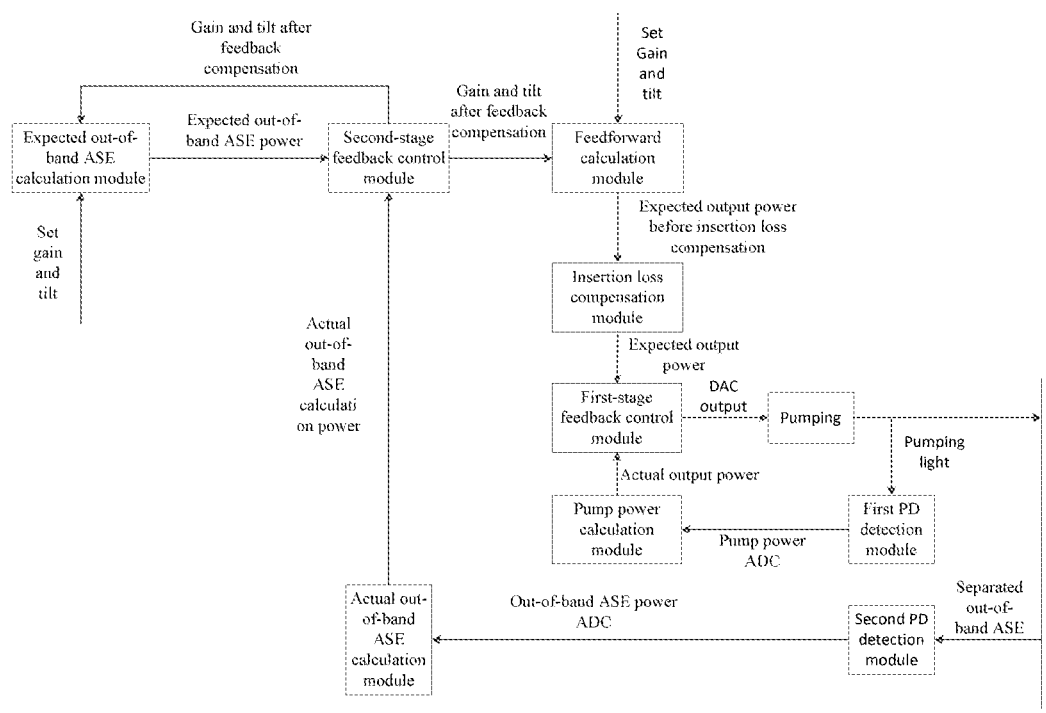
FIG. 2 is a composition diagram of a system for controlling a Raman fiber amplifier according to an embodiment of the present disclosure.

In combination with FIG. 2, for each pump, the actual out-of-band ASE power is obtained by performing PD detection on the out-of-band ASE separated by the pump, and then by performing calculation in combination with the power and leakage factor of PD detection after photoelectric conversion and analog-digital conversion.

Step 204, in a case where the out-of-band ASE power of a pump is not locked, determining gain compensation and tilt compensation of the pump through second-stage feedback control, and feeding the compensation back into the feedforward formula and the ASE formula for recalculation.

The control target of the second-stage feedback control is the out-of-band ASE power, and it is determined whether the gain and tilt are respectively locked to the target gain and the target tilt through determining whether the actual out-of-band ASE power reaches the expected out-of-band ASE power. In a case where the gain and tilt are not respectively locked to the target gain and the target tilt, the gain and tilt currently set need to be regulated, which is specifically as follows: setting a reasonable proportional parameter and differential parameter through the PID controller for dynamic regulation, outputting a gain compensation amount $\Delta$gain and a tilt compensation amount $\Delta$tilt by the PID controller, and then compensating the same to the gain and tilt to change the feedforward calculation result, i.e. obtaining the current expected output power of each pump by performing recalculation according to mw=f (gain+$\Delta$gain, tilt+$\Delta$tilt).

In order to ensure the precision of the gain and the tilt, not only the feedforward algorithm control is required to be compensated, but also the control of the expected out-of-band ASE is required to be compensated. The gain compensation amount $\Delta$gain and the tilt compensation amount $\Delta$tilt of the second-stage feedback are simultaneously substituted into the ASE formula for performing corresponding compensation, i.e. obtaining the expected out-of-band ASE power of each pump by performing recalculation according to expect_ase=g(gain+$\Delta$gain, tilt+$\Delta$tilt), so as to improve the locking precision and realize more precise control.

Step S205, repeatedly performing the first-stage feedback control and the second-stage feedback control to each pump until the actual out-of-band ASE power of the pump is locked to the corresponding expected out-of-band ASE power to realize the locking of the gain and the tilt.

Referring to FIG. 2, for each pump, two-stage feedback control can form a closed-loop feedback control structure, which is specifically as follows: after the desired output power of the pump is obtained by performing the feedforward calculation again in step 204, the first-stage feedback realizes the locking of the pump optical power again according to the recalculation result, and then whether the gain and tilt in the second-stage feedback are locked is repeatedly determined; in a case where the gain and tilt are not locked, recalculation is performed after feedback compensation is continuously performed, and the first-stage feedback is continuously regulated according to the recalculation result; thus, by repeating the above steps to regulate according to the closed-loop, the locking of out-of-band ASE power is finally realized, and then the locking of the gain and the tilt is realized.

In the embodiment of the present disclosure, both the first-stage feedback control and the second-stage feedback control are realized by using the PID feedback algorithm. Of course, in an optional solution, other suitable feedback algorithms may also be used according to actual application situations and requirements to realize feedback control, which is not limited here.

In the above-mentioned method for controlling the Raman fiber amplifier provided by the embodiment of the present disclosure, a structure for combining feedforward and multi-closed loop feedback control is used, and the rapid locking of pump power can be realized through the feedforward calculation and the first-stage feedback, and the automatic compensation regulation of the gain and the tilt can be realized by means of the control of the out-of-band ASE through the second-stage feedback, which improves the control precision of the gain and the tilt and accelerates the response speed, and finally realizes the locking of the gain and the tilt.

In step 201, in order to prevent overshoot and undershoot caused by too fast gain or tilt regulation, for each pump, in a case where the target gain and the target tilt are set after the pump is turned on, the regulation is performed in a stepping manner, i.e. gradually increasing from zero, gradually modulating a gain from zero to near the target gain range, and gradually modulating a tilt from zero to near the target tilt range. For example, in a case where the target gain is 10, the modulation can be performed by increasing 0.5 every time from 0 until 10.

That the power result obtained through the feedforward formula calculation is taken as the expected output power is achieved by the calibration and control in an ideal environment, i.e. the insertion loss is 0. However, in practical applications, different optical fibers accessing a pump will have different insertion losses, then in a case where the compensation is not performed, but the same pump power (i.e. the expected output power obtained through the feedforward formula calculation) is used for control, the gain and the tilt which are actually controlled deviate greatly in a case where the insertion loss is large, so that the locking precision of the gain and the tilt is poor.

In view of the influence of the above-mentioned optical fiber insertion loss, a process for insertion loss compensation control is added in the embodiment of the present disclosure, and the gain deviation caused by different insertion loss can be compensated in a case where different fibers are accessed according to the adaptive calculation and compensation of the current access optical fiber. The details are as follows: when each pump is turned on, one small power is output by a corresponding pump firstly, and then the insertion loss of optical fiber currently accessing each pump is calculated through the detection power of the actual out-of-band ASE, so that the initial value is set for the insertion loss compensation. After the expected output power of each pump is calculated by using the feedforward formula in step 201, the corresponding insertion loss obtained by calculation in advance is compensated to the expected output power of each pump, and the compensated calculation result is used as the expected output power for subsequent use. That is to say, the expected output power ultimately used by each pump is obtained by adding the expected output power obtained via the feedforward calculation to the insertion loss compensation. By adding the insertion loss compensation, the control precision of the amplifier can be further improved.

In the embodiment of the present disclosure, the feedback compensation for the gain can be divided into two stages of compensation, wherein the gain compensation caused by the second-stage feedback control in step 204 may be considered to be a compensation of the second stage, which compensates a gain deviation generated by errors existing in related parameters of calibration in a case where the feedforward formula is calibrated, thereby performing gain compensation, and performing the feedforward calculation again. However, in a case where errors exist in the calibration of the calculation formula (i.e. ASE formula) of the expected out-of-band ASE power, even if the actual out-of-band ASE power realizes locking because of reaching the expected out-of-band ASE power, the gain deviation will also exist.

In view of the gain deviation caused by the error of the above-mentioned ASE formula, the unamplified input optical power obtained through the current calculation can be compared with the input optical power in a case where the pump is turned off, so as to determine whether deviation exists between the two power values. In a case where a deviation exists, it proves that a deviation exists in the calibration of the ASE formula, then the gain compensation is needed, and this compensation is the compensation of the first stage. Specifically, in step 201, after the set target gain is provided, determining a gain compensation amount corresponding to the gain point currently set according to the error fitting curve of different gain points, and performing compensation to the target gain currently set by the gain compensation amount, so as to be subsequently used in the calculation according to the feedforward formula and the ASE formula. The error fitting curve needs to be determined in advance before step 201, which is specifically as follows: setting N fixed gain points in an AGC mode, respectively calculating a difference between unamplified input optical power at each fixed gain point and input optical power when the pump is turned off, and performing curve fitting on the differences and the gains, so as to obtain an error fitting curve of different gain points, wherein N≥3.

In the embodiment of the present disclosure, the one-time compensation for the feedback compensation of the tilt may be performed on the basis of the gain compensation of the second stage, which is because the tilt compensation amount and the gain compensation amount are a fixed ratio obtained by one calibration, then whenever the setting gain, the working mode, the optical fiber type and other factors are changed, the tilt compensation amount is recalculated and the one-time compensation is performed after the gain is locked and stabilized. The fixed ratio needs to be calibrated in advance in the AGC mode, so that the compensated tilt approaches the set target tilt, thereby improving the tilt control precision.

For each pump, a series of calibration need to be performed on the Raman fiber amplifier in advance before normal working: PD detection power calibration, insertion loss calibration, feedforward formula calibration, ASE formula calibration, first-stage feedback control calibration, second-stage feedback control calibration, and error fitting curve determination. The insertion loss calibration and the error fitting curve determination have been introduced previously, and will not be repeated here. The remaining several calibration processes will be described in one-to-one as follows.

For the PD detection power calibration, it comprises output power calibration of each pump, out-of-band ASE detection power calibration, and input detection power calibration, etc., and through pre-calibration, it can be ensured that the power value detected by the PD has a higher precision in the normal working mode.

For the feedforward formula calibration, the feedforward formula needs to perform calibration according to the tilt, and under the current tilt, the output power of each pump under different gains is determined, and then the curve fitting is performed; the relevant parameter(s) in the feedforward formula mw=f (gain, tilt) corresponding to each pump according to the fitting curve is determined, and then the calibration of the feedforward formula is completed.

For the ASE formula calibration, the ASE formula also needs to perform calibration according to the tilt, and under the current tilt, the leakage factor of each pump and the out-of-band ASE power under different gains are determined, and then the curve fitting is performed; the relevant parameter(s) in the ASE formula expect_ase=g (gain, tilt) corresponding to each pump is determined according to the fitting curve, and then the calibration of the feedforward formula is completed.

For the first level feedback control calibration, the APC mode, i.e. power mode, is entered, the expected output power of each pump is set, and the proportional parameter, differential parameter and regulation period of the PID feedback algorithm in the first-stage feedback control are regulated, so that the output of each pump can be stably locked to the target power (i.e. expected output power), thereby making the first-stage feedback control effective.

For the second level feedback control calibration, the APC mode is entered, the expected gain and expected tilt of each pump are set, and the proportional parameter, differential parameter and regulation period of the PID feedback algorithm in the first-stage feedback control are regulated, so that the out-of-band ASE power of each pump can steadily approach the target value (i.e. expected out-of-band ASE power) through the feedback regulation, and the second-stage feedback calls the first-stage feedback for control, and realizes the lock of the out-of-band ASE power through the compensation of gain and tilt.

Through the above-mentioned series of calibration steps, the control design of the Raman fiber amplifier can be realized, which improves the gain and tilt precision, having good transient characteristics and high portability.

In summary, the method for controlling the Raman fiber amplifier provided by the embodiments of the present disclosure has the following beneficial effects: the feedforward algorithm combined with the multi-closed loop feedback control algorithm is used, and each pump output is obtained through calculation by the feedforward calibration, which has higher versatility compared with the pump proportional distribution algorithm, and can be flexibly applied to Raman fiber amplifiers in a C+L band, a C band, a L band and other bands, in addition, the compensation regulation is performed to the gain and the tilt by using the multi-closed loop feedback, which improves the control precision of the gain and the tilt and accelerates the response speed; the insertion loss compensation and the gain compensation brought by the ASE formula error are also added, so as to further improve the control precision. This control method. has been verified in a plurality of projects. In addition to having high-precision control characteristics, it also has excellent performance in transient suppression, opens a variety of parameter configurations, and can perform adaptive control according to the configuration parameters in different environments, with stable performance, better compatibility and portability.

Embodiment 2

On the basis of the above-mentioned embodiment 1, an embodiment of the present disclosure also provides a system for controlling a Raman fiber amplifier, which can be used to complete the method for controlling the Raman fiber amplifier as described in embodiment 1, realizing output power control and control regulation of the gain and the tilt of a plurality of pumps.

As shown in FIG. 2, the control system provided by the embodiment of the present disclosure includes a feedforward calculation module, a pump power calculation module, a first-stage feedback control module, an expected out-of-band ASE calculation module, an actual out-of-band ASE calculation module, a second-stage feedback control module, a PD detection module, and one or more pumps. It can be seen from the figure that the first-stage feedback control module is connected to the feedforward calculation module, the pump power calculation module, and the one or more pumps, respectively, and the second-stage feedback control module is connected with the expected out-of-band ASE calculation module, the actual out-of-band ASE calculation module, and the feedforward calculation module, respectively. The PD detection module is provided with two modules: a first PD detection module and a second PD detection module, wherein the first PD detection module is used for detecting the pump light, and is connected with the pump power calculation module; and the second PD detection module is used for detecting the out-of-band ASE separated by the pump, and is connected with the actual out-of-band ASE calculation module.

The feedforward calculation module is used for calculating the expected output power of each pump by using a feedforward formula according to the currently set gain and tilt, and feeding back the calculation result to the first-stage feedback control module; the pump power calculation module is used for calculating the actual output power of each pump according to the output result of the first PD detection module, and feeding back the calculation result to the first-stage feedback control module; the first-stage feedback control module locks the actual output power of each pump to the expected output power through a PID feedback algorithm after obtaining the expected output power and the actual output power of each pump.

Furthermore, the expected out-of-band ASE calculation module is used for calculating expected out-of-band ASE power of each pump by using an ASE formula according to the currently set gain and tilt, and feeding back the calculation result to the second-stage feedback control module; and the actual out-of-band ASE calculation module is used for calculating actual out-of-band ASE power of each pump according to the output result of the second PD detection module, and feeding back the calculation result to the first-stage feedback control module. The second-stage feedback control module determines whether the gain and the tilt are locked through determining whether out-of-band ASE reaches expectation after obtaining the expected out-of-band ASE power and actual out-of-band ASE power of each pump, and in a case of not being locked, determining gain compensation and tilt compensation of each pump through a PID feedback algorithm, and feeding them back to the feedforward calculation module and the expected out-of-band ASE calculation module for recalculation until the gain and the tilt are locked.

That the power result obtained through the feedforward formula calculation is taken as the expected output power is achieved by the calibration and control in an ideal environment, i.e. the insertion loss is 0. Considering that different optical fibers accessing a pump in practical applications will have different insertion losses, and in a case where the compensation is not performed, it is easy to cause poor locking precision of gain and tilt, accordingly, an insertion loss compensation module can also be added between the feedforward calculation module and the first-stage feedback control module. In a case where each pump is turned on, small power is output to the corresponding pump firstly, and then the insertion loss of current access optical fiber is calculated through the detection power of the actual out-of-band ASE, and is stored in the insertion loss compensation module. After the insertion loss compensation module is added, the feedforward calculation module transmits the calculated expected output power to the insertion loss compensation module, and the insertion loss compensation module compensates the insertion loss to the expected output power of each pump, and feeds back the compensated expected output power to the first-stage feedback control module for subsequent use. By adding insertion loss compensation, the control precision of the amplifier can be further improved.

In the above-mentioned system for controlling the Raman fiber amplifier provided by the embodiment of the present disclosure, a structure of feedforward combined with multiple closed-loop feedback control is adopted, and the rapid locking of pump power can be realized through the feedforward calculation module and the first-stage feedback module, and the automatic compensation regulation of the gain and the tilt can be realized by means of the control of the out-of-band ASE through the second-stage feedback control module, which improves the control precision of the gain and the tilt and accelerates the response speed, and finally realizes the locking of the gain and the tilt. In addition, the insertion loss compensation module can be added to compensate the gain deviation caused by the access of optical fiber, so that the control precision is further improved.

The above mentioned are the optimal embodiments to which the present disclosure is applied, and can't restrict the present disclosure. The amendment(s), equivalent replacement(s), modification(s), and etc., without departing from the spirit and principle of the present disclosure, shall all fall within the scope of protection of the disclosure.

What is claimed is:

1. A method for controlling a Raman fiber amplifier, characterized in comprising:
   according to a set target gain and a set target tilt, calculating expected output power of each pump by using a feedforward formula, and obtaining actual output power of each pump through PD detection;
   locking the actual output power of each pump to the corresponding expected output power through first-stage feedback control;
   according to the set target gain and the set target tilt, calculating expected out-of-band ASE power of each pump by using an ASE formula, and obtaining actual out-of-band ASE power of each pump through PD detection;
   in a case where the out-of-band ASE power of a pump is not locked, determining gain compensation and tilt compensation of the pump through second-stage feedback control, and feeding the compensation back to the feedforward formula and the ASE formula for recalculation; and
   repeatedly performing the first-stage feedback control and the second-stage feedback control to each pump, until the actual out-of-band ASE power of the pump is locked to the corresponding expected out-of-band ASE power to realize the locking of the gain and the tilt.

2. The method for controlling the Raman fiber amplifier of claim 1, characterized in that, before calculating the expected output power of each pump by using the feedforward formula, the method further comprises: outputting one power to the corresponding pump in a case where each pump is turned on, and calculating an insertion loss of optical fiber currently accessing each pump according to the detected actual out-of-band ASE power;
   then after the expected output power of each pump is calculated by using the feedforward formula, the method further comprises: compensating the corresponding calculated insertion loss to the expected output power of each pump as the expected output power for subsequent use.

3. The method for controlling the Raman fiber amplifier of claim 1, characterized in that, for each pump, in a case of where setting the target gain and the target tilt, performing regulation in a stepping manner for the both, thus gradually modulating the gain from zero to the target gain, and gradually modulating the tilt from zero to the target tilt.

4. The method for controlling the Raman fiber amplifier of claim 1, characterized in that, for each pump, the process of the first-stage feedback control is:
   setting a reasonable proportional parameter and a reasonable differential parameter through a PID controller, and regulating pump output DAC so as to regulate a pump driving current without shaking, thereby locking the actual output power of the pump to the corresponding expected output power.

5. The method for controlling the Raman fiber amplifier of claim 1, characterized in that, before calculating the expected output power of each pump by using the feedforward formula according to the set target gain and target tilt, the method further comprises:
   setting N fixed gain points in an AGC mode, respectively calculating a difference between unamplified input optical power at each fixed gain point and input optical power in a case where the pump is turned off, and performing curve fitting on the differences and gains, so as to obtain an error fitting curve of different gain points, wherein $N \geq 3$;
   then after the set target gain is provided, determining a gain compensation amount corresponding to the gain point currently set according to the error fitting curve, and performing compensation to the target gain currently set by the gain compensation amount, so as to be subsequently used in the feedforward formula and the ASE formula.

6. The method for controlling the Raman fiber amplifier of claim 1, characterized in that, for each pump, the feedforward formula needs to be calibrated according to the tilt in advance, which is as follows:
   under the current tilt, determining output power of each pump under different gains, and then performing curve fitting; determining a relevant parameter in the feedforward formula corresponding to each pump according to a fitting curve, and then completing a calibration of the feedforward formula.

7. The method for controlling the Raman fiber amplifier of claim 1, characterized in that, for each pump, the ASE formula needs to be calibrated according to the tilt in advance, which is as follows:
   under the current tilt, determining a leakage factor and out-of-band ASE power of each pump under different gains, and then performing curve fitting; and determining a relevant parameter in the ASE formula corresponding to each pump according to a fitting curve, and then completing a calibration of the ASE formula.

8. The method for controlling the Raman fiber amplifier of claim 1, characterized in that, for each pump, the first-stage feedback control needs to be calibrated in advance, which is as follows:
   entering a APC mode, setting the expected output power of each pump, regulating a proportional parameter, differential parameter and regulation period of a PID feedback algorithm in the first-stage feedback control, so that the output of each pump can be stably locked to target power, thereby making the first-stage feedback control effective.

9. The method for controlling the Raman fiber amplifier of claim 1, characterized in that, for each pump, the second-stage feedback control needs to be calibrated in advance, which is as follows:

entering a AGC mode, setting an expected gain and an expected tilt of ease pump, regulating a proportional parameter, differential parameter and regulation period of a PID feedback algorithm in the second-stage feedback control, so that the out-of-band ASE power of each pump can steadily approach a target value through feedback regulation, thereby realizing the lock of the out-of-band ASE power through the gain compensation and the tilt compensation.

10. A system for controlling a Raman fiber amplifier, characterized in comprising: a feedforward calculation module, a pump power calculation module, a first-stage feedback control module, an expected out-of-band ASE calculation module, an actual out-of-band ASE calculation module, a second-stage feedback control module, and one or more pumps;

wherein the feedforward calculation module is used for calculating expected output power of each pump according to a currently set gain and a currently set tilt;

the pump power calculation module is used for calculating actual output power of each pump according to PD detection;

the first-stage feedback control module is used for locking the actual output power of each pump to the expected output power through a feedback algorithm;

the expected out-of-band ASE calculation module is used for calculating expected out-of-band ASE power of each pump according to the currently set gain and the currently set tilt;

the actual out-of-band ASE calculation module is used for calculating actual out-of-band ASE power of each pump according to the PD detection; and the second-stage feedback control module is used for determining gain compensation and tilt compensation of each pump through a feedback algorithm, and feeding them back to the feedforward calculation module and the expected out-of-band ASE calculation module.

* * * * *